Figure 1:
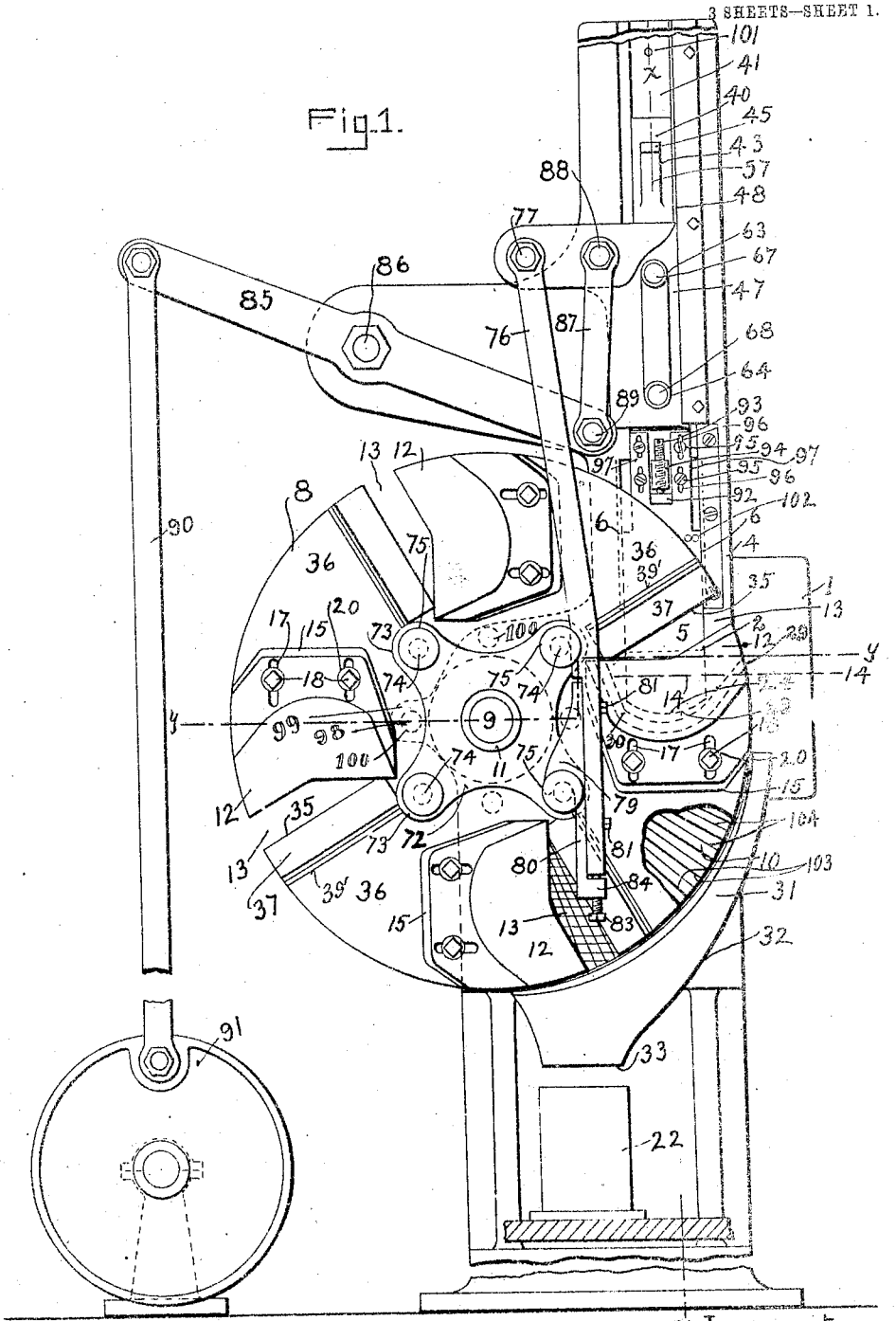

No. 846,057. PATENTED MAR. 5, 1907.
J. SCHIES.
APPARATUS FOR FEEDING AND DELIVERING GLASS.
APPLICATION FILED MAR. 19, 1906.

3 SHEETS—SHEET 1.

Witnesses.
Theodore C. Jung
Cordelia O'Hearn

Inventor.
John Schies,
by his Attorney

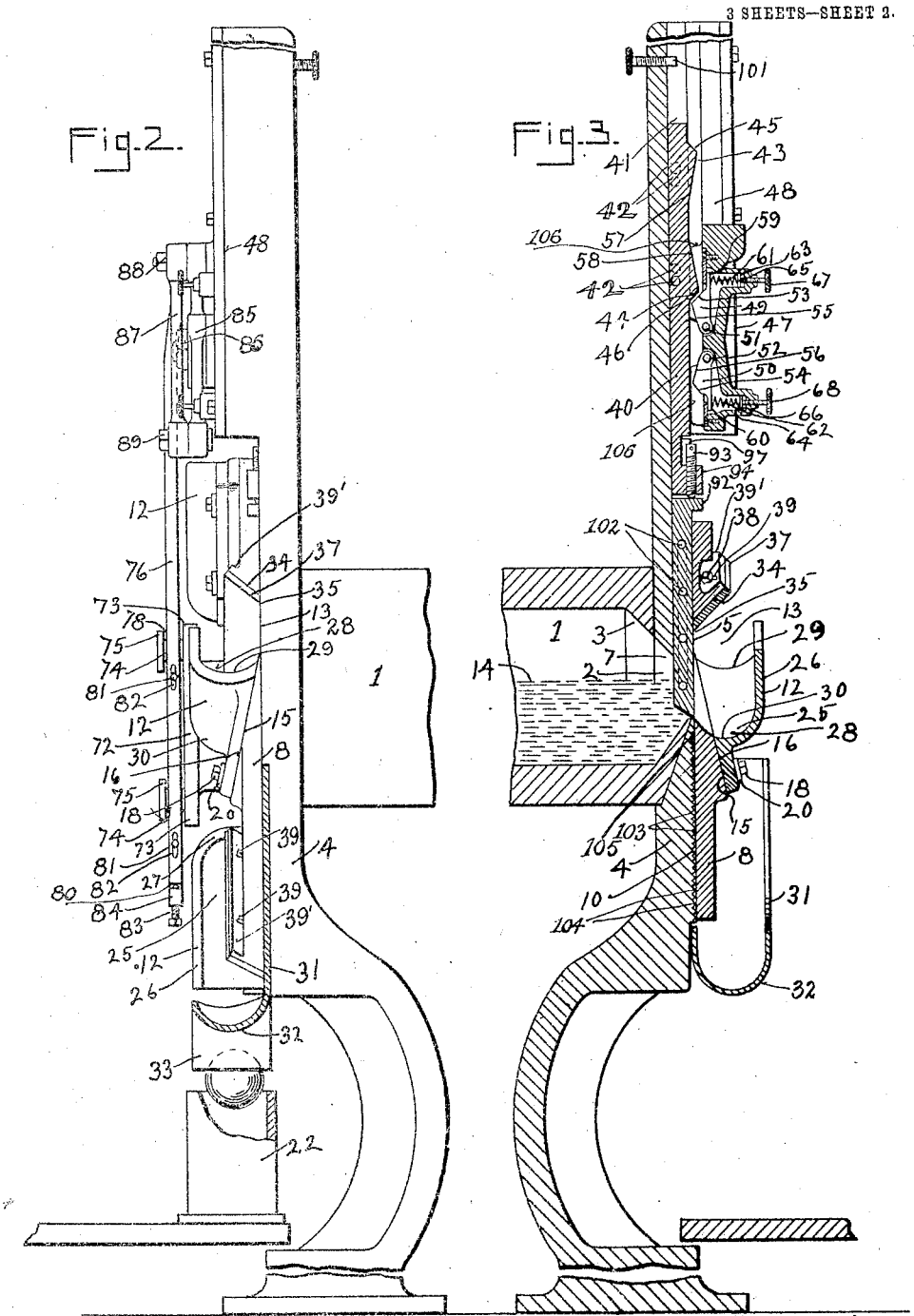

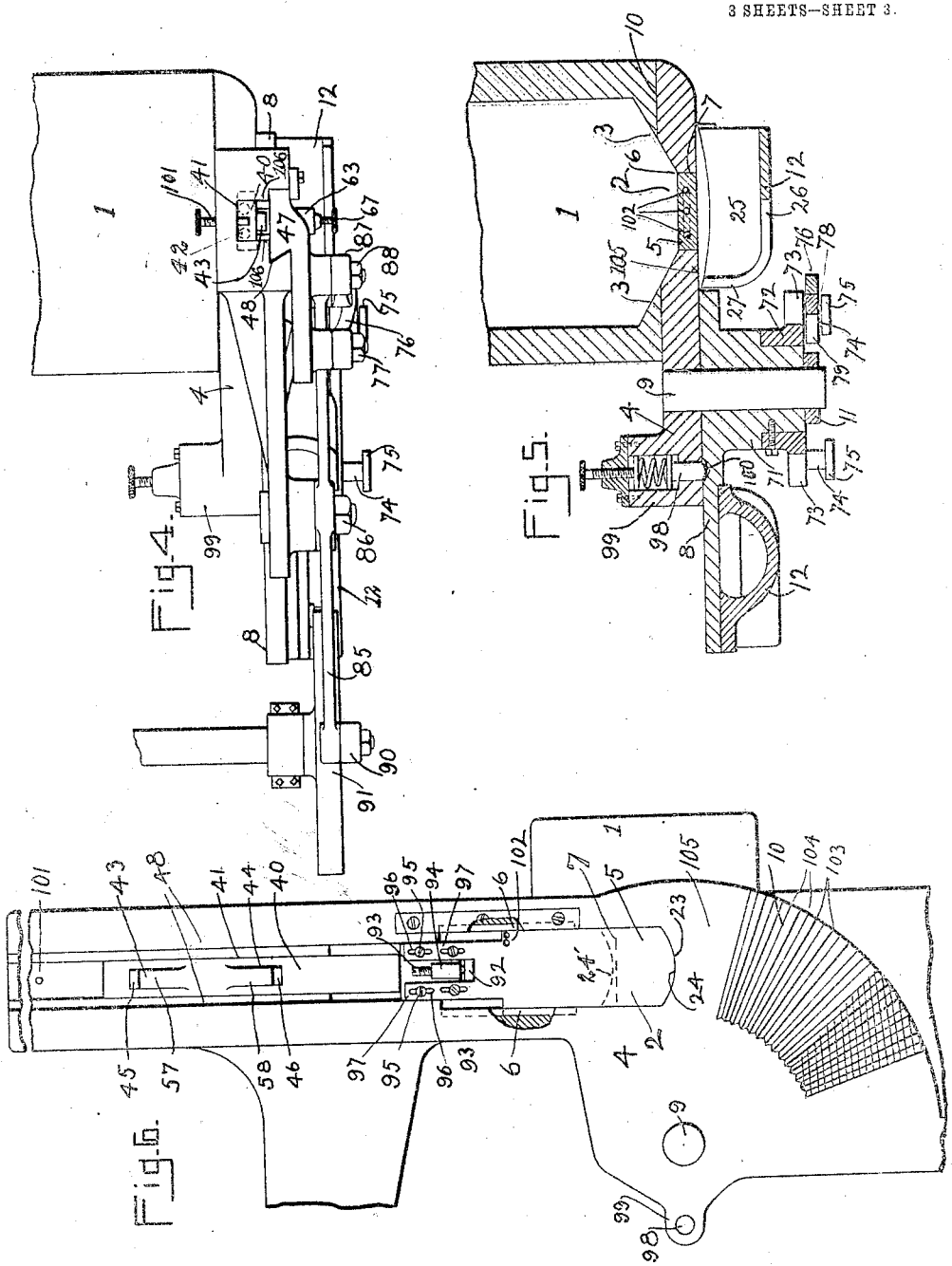

UNITED STATES PATENT OFFICE.

JOHN SCHIES, OF ANDERSON, INDIANA.

APPARATUS FOR FEEDING AND DELIVERING GLASS.

No. 846,057.

Specification of Letters Patent.

Patented March 5, 1907.

Application filed March 19, 1906. Serial No. 306,826.

*To all whom it may concern:*

Be it known that I, JOHN SCHIES, a citizen of the United States, residing at Anderson, in the county of Madison and State of Indiana, have invented certain new and useful Improvements in Apparatus for Feeding and Delivering Glass, of which the following is a specification.

My invention relates to new and improved means for feeding and delivering glass directly from the glass-melting pot or furnace or chamber containing the molten glass in order to save the intermediate manual handling or manipulation of the same between said chamber and the forming device—such as a press-mold, blow-mold, or the like—and my invention has for its object the providing of means whereby the glass may be fed from the said chamber and as it is fed divided or severed into blanks or ingots of predetermined size, dependent on the amount of glass to be employed in the manufacture of the article, and consists in providing the melting-pot or liquid-glass chamber with a mouth through which the molten glass is adapted to discharge into a receptacle arranged to have movement imparted thereto transversely of the mouth; further, in providing a melting or fluid chamber having a mouth from which the glass is adapted to discharge, across which mouth a cutting blade, knife, or gate is adapted to be moved for severing the ingot or blank from the molten glass, the said ingot or blank being received into a receptacle having movement transversely of the mouth; further, in providing a receptacle in which the molten glass is adapted to find a level dependent on the level of glass in the molten-glass chamber; further, in providing a receptacle arranged to receive and limit the flow of molten glass from the molten-glass chamber; further, in providing a molten-glass chamber and blank-receptacle so correlated as to normally cause flow from said molten-glass chamber into said receptacle until the glass in said receptacle has obtained the level of molten glass in said chamber, whereupon said flow will cease; further, in providing adjustment to a receptacle of the character mentioned whereby the amount of glass feeding thereinto may be regulated; further, in making a molten-glass receptacle open-sided for causing the blank or ingot received thereby to impinge against a face with relation to which the said receptacle is given movement for imparting a rolling motion to said ingot or blank; further, in preparing the ingot or blank for the forming device by imparting thereto a rolling motion; further, in mounting receptacles of the character described upon an intermittently-rotated carrier adapted to be stationarily positioned while said receptacles are receiving the molten glass for forming the ingot or blank and for having a rotary motion imparted thereto intermittently for discharging said severed ingot or blank, and the invention will be further readily understood from the following description and claims and from the drawings, in which latter—

Figure 1 is a front elevation of my improved device, partly broken away. Fig. 2 is a side elevation of the same. Fig. 3 is a vertical section on the line $x\,x$ of Fig. 1. Fig. 4 is a plan view of my improved device. Fig. 5 is a cross-section on the irregular line $y\,y$ of Fig. 1; and Fig. 6 is a front elevation of the column, partly broken away, showing the slideway with the knife and knife-bar therein.

1 represents a molten-glass chamber having a mouth 2. This mouth widens inwardly, as shown at 3, so that the glass may be subjected to the heat in the chamber as long as possible.

4 is a housing adapted to be secured with relation to the molten-glass chamber and serving as a supporting-frame for the operating devices of my improved apparatus. A knife 5 has reciprocation in a slideway 6 of the housing, across an opening 7 in said housing, said opening forming a part of the mouth 2 of said molten-glass chamber.

A carrier 8 has intermittent rotation on a trunnion 9 on said housing and is held with sliding fit against the face 10 of said housing by means of a collar 11. Receptacles 12 are mounted on said carrier equal distances apart. There may be any suitable number of these receptacles, of which I have shown four. At the receptacles the carrier 8 is provided with slots 13. The receptacle-carrier is adapted to come intermittently to positions of rest when the respective slots 13 register with the mouth extending from the chamber 1, and when in such position of rest the gate or knife 5 is moved into raised relation for permitting the molten glass to discharge from the chamber 1 through the mouth and the slot 13 onto the receptacle 12 at the time in front of the mouth. In order to permit this discharge, the level of the molten glass (shown at 14) is preferably kept at such a height as to cause flow from said chamber. I also prefer that the walls of the receptacles extend as high as or higher than the glass-level in said chamber when said receptacles are located at said mouth, so that in case of temporary stoppage of the machine or if for other reason the regular intermittent motion of the carrier ceases the walls of said receptacle will limit the flow of glass from said chamber, thereby preventing overflow or waste of glass. This construction has the further advantage that the predetermined quantity of glass in the receptacle can be determined to a nicety, and I provide means for adjusting the receptacles with relation to the mouth for adjusting this predetermined quantity of glass, and I do this preferably by providing inclined ways 15 on said carrier at said slots upon which the inclined ways 16 of said receptacles have bearing, the said receptacles being provided with slots 17, through which bolts 18 take against washers 20 for securing the receptacles in place, the slots being wider than the bolts for permitting vertical as well as lateral adjustment of the receptacles for determining the amount of glass which may be received by the receptacles and positioning the receptacles so that its walls may be as high as or higher than the glass-level. I prefer to make the connection between the carrier and receptacles upon a slanting face for reasons hereinafter explained.

As soon as sufficient glass to form the article to be manufactured has discharged into the receptacle the knife 5 is caused to descend for severing said predetermined amount of glass that has so been discharged from the body of the molten glass, thereby forming the ingot of blank from which the article is to be formed, and rotary movement is also imparted to the carrier for removing the receptacle into which the glass has just discharged from the mouth and causing the next-succeeding slot and receptacle to register with said mouth, whereupon the rotation of the carrier ceases and the knife 5 is raised for permitting the molten glass to discharge into said succeeding receptacle. In the meantime the ingot or blank of glass (as, see the blank 21) has been discharged from the last preceding receptacle, preferably in manner hereinafter explained. It will further be noted that when the knife descends to cut off the predetermined ingot or blank of glass that it acts as a gate for closing the mouth.

It is desirable that the blank or ignot shall be gathered together into compact mass and formed, for instance, into substantially ball shape, so that when it is operated on in its succeeding manipulation it may form an article which is free of seams and blow-holes. The ingot or blank is adapted to be operated on after being discharged from my improved feeding and delivering apparatus, such succeeding manipulation being such as may be necessary or desirable for forming the finished article to be made. Thus the delivery may be made into a mold, and I have indicated a mold into which the delivery may be made at 22, which may be the ordinary press-mold of a glass-pressing machine or the press or blow mold of a glass-blowing machine. In order to impart the most desirable shape to the glass ingot or blank, I prefer to round off the bottom of the mouth, as shown at 23, and to correspondingly shape the cutting edge of the knife, as shown at 24, the cutting edge of the knife curving downwardly for permitting easy delivery of the molten glass through the mouth. The glass-receptacles preferably comprise a bottom 25, a side 26, and a back 27, the inside faces of the receptacle being rounded, as shown at 28. In certain adjustments of the receptacles the guide-face 15 will form part of the bottom of the receptacle, and this face being made slanting readily forms part of the bottom of the receptacle. I also preferably make the receptacles open-sided at the side adjacent to the housing and locate the mouth of the molten-glass chamber at said open side for permitting the molten glass to flow into said receptacle.

When motion is imparted to the receptacle-carrier, the severed ingot or blank makes contact with the face 10, which is shown ribbed, whereby the ingot or blank is caused to roll in the receptacle, it being understood that when the carrier is given its intermittent rotary movement the receptacle will move transversely of the mouth—i. e., descend away from the mouth—the housing, however, with its face 10, remaining stationary, and thereby acting as a stationary contact-face against the moving ingot or blank, which results in a rolling motion given to the blank. It will be further noted that the receptacles are placed tangentially on the rotary carrier, the outer or discharge end 29 of the bottom being higher than the inner end 30 of said bottom at the receptacle into which the molten glass is at the time discharging, thereby positioning the plane of the bottom tangentially with relation to the rotary axis of the carrier. When now the carrier is given its intermittently rotary movement, the angle of the bottom with relation to the horizontal plane will change, causing its outer or discharge end 29 to gradually assume a position below the level of the inner end 30 of the receptacle into which the discharge has just taken place, and as the carrier continues its rotation the ingot or blank, besides the rolling movement imparted to it by the stationary face of the housing, will also roll along the bottom of the receptacle toward its discharge end for discharging the ingot or blank into the mold 22, whereupon the said ingot or blank is subjected to its succeeding manipulations.

If too great a speed of rotation is given the carrier, there may be danger of the blank being discharged at other points than at the lower position of rest of the charged receptacle, and in order to overcome the difficulties incident to this and at the same time continue rolling motion to the blank, I provide a chute 31, secured to the housing and having a bottom 32, located, preferably, beyond the periphery of the carrier eccentrically with relation to said carrier and having a delivery-spout 33 above the forming device. 22. I prefer also to bevel the upper or advancing walls 34 of the slots 13 for forming a cutting edge 35 at said advancing wall of the slot adapted to take across the mouth of the molten-glass chamber and the knife 5 for aiding in severing the ingot or blank from the molten glass when the rotary motion is imparted to the carrier. This cutting edge also serves as a knife when the knife 5 is removed or out of commission, the webs 36 of the carrier between the slots serving as gates between times of registry of said slots with said mouth. This cutting edge 35 may be on a separate blade 37, which, if desired, may have adjustment with relation to the carrier by means of bolts 38, taking through slots 39 in lugs 39' on said carrier and into the bar.

I prefer to automatically operate the knife 5 and rotating carrier, and for this purpose I provide mechanism, whereby, preferably, the knife 5 in its descent or closing movement is caused to act just prior to the rotary movement imparted to the receptacle-carrier, which rotary movement is immediately followed by the ascending or opening movement of the knife 5 immediately after the rotary movement of the receptacle-carrying plate has ceased.

40 is a bar for the knife operating in slideway 41 and may be backed by balls 42 for reducing friction. The bar is provided with lugs 43 44, having wiping-faces 45 46, which are preferably slanted forwardly toward each other.

47 is a slide reciprocating in slideway 48 in the housing.

49 50 are wipers pivoted, respectively, at 51 52 to the slide 47 and having wiping-faces 53 54, adapted to respectively engage the faces 46 45 for operating the bar 40 up and down and also having rearwardly-receding faces 55 56, adapted to make contact with the lugs 43 44, which have rearwardly-receding faces 57 58 for causing said wipers to recede out of the path of said lugs. The tails 59 60 of said wipers 49 50 are respectively backed by springs 61 62 in pockets 63 64, the springs respectively taking between the tails 59 60 and washers 65 66 in the respective pockets backed by adjusting-screws 67 68 for regulating the tension of said springs. This construction also prevents breakage of the parts.

The hub 71 of the carrier 8 is provided with a spider 72, the arms 73 of which have pins 74, provided with collars 75. The slide 47 has a rod 76 pivoted thereto at 77, the said pivot being preferably located in a vertical plane between the vertical planes of the pin, which said rod is adapted to engage and of the rotary axis of the carrier for causing said rod by gravity to normally lie and travel in the groove 78, formed at the respective pins between the arms 73 and collar 75 of said pins. The rod is provided with a shoulder 79, adapted to engage the respective pins for translating the reciprocating movement of said rod into rotary movement of said carrier. For permitting adjustment of the shoulder it may be mounted on a bar 80, adjustably secured to the rod by means of bolts 81 passing through the bar and slots 82 in the rod, a take-up bolt 83 screwing through a lug 84 on the bar against the end of the rod.

For reciprocating the slide 47 a walking-beam 85 is pivoted at 86 to the housing and has a link 87 articulating it with the slide by means of the connecting-pins 88 89, movement being imparted to said walking-beam as by means of a crank-rod 90, connecting therewith from a crank 91, operated in suitable manner.

The knife 5 is preferably made separable from and adjustable with relation to its bar, as by providing the knife with a step-lug 92, an adjusting-screw 93 screwing thereagainst in a lug 94 on the knife-bar, securing-bolts 95 taking through slots 96 in extensions 97 on the knife and into the knife-bar.

Assuming that the knife is in raised position, the rod 76 also being in raised position, the slide 47 is caused to descend. In descending the wiper 50 first makes contact with the wiping-face 45 of the knife-bar, causing the knife to descend and close the mouth of the molten-glass chamber for stopping the flow of glass therefrom and cutting off the blank or ingot of glass. The wiper is so constructed by reason of the angle at which the wiping-faces are placed and the tension imparted by the spring to the wiper that sufficient downward force is exerted upon the knife to properly and clearly cut off the glass blank or ingot, and when this has been accomplished the wiper 50 will recede, permitting the slide to descend for bringing the shoulder 79 into contact with the pin 74 on the rotating carrier 8 which at the time is in line therewith, thereby imparting rotary movement to said carrier, the descent of the slide continuing until the next succeeding slot in the carrier has been caused to register with the mouth of the chamber 1, whereupon a spring-actuated catch 98, mounted in a lug 99 of the housing, will take into a notch 100 on the carrier for causing cessation of movement of the carrier at the proper point. In the meanwhile rearwardly-receding face 55 of the wiper 49 has made contact with the lugs 43 44, the said wiper thereby being pushed out of line with said lugs until the lugs are passed by the wiper, whereupon the wiper will reënter the path of said lugs. After the rotary movement has been imparted to the carrier the slide 47 begins its upward travel and the parts are so correlated that immediately upon such upward travel being initiated the wiping-face 53 of the wiper 49 will engage the wiping-face 46 of lug 44, carrying the knife upwardly with it in the beginning of the upward travel of the slide and until the knife-bar makes contact with a stop 101, shown in the form of a releasable screw in the rear of the housing, the excess of pressure upon said bar thereby causing said wiper 49 to recede out of the path of said lug and the lug 43, the rearwardly-receding face 56 of the wiper 50 also passing said lugs for pushing the wipers out of path therewith, the wiper 50 immediately snapping back into its path upon passage of lug 43, ready to engage said lug at the beginning of the downward movement of the slide. Having the pair of wipers lengthens the time during which the mouth of chamber 1 may remain open for discharging molten glass, which is a desirable feature.

If desired, the knife may be provided with a bore 102 for permitting the circulation of a cooling liquid therethrough, and the face 10, against which the ingot or blank is adapted to roll, may be provided with grooves 103, forming ribs 104, or a roughened surface for aiding in such rolling function. This roughened surface preferably stops short of the mouth 2 for forming a plane face 105 adjacent the glass-receiving edge of the receptacle when the latter is receiving molten glass. The position of the cutting edge of the knife when the latter is in raised relation is shown by the dotted line 24' in Fig. 6. The slide 47 may also be provided with shoes 106, taking against the bar 40, for aiding in retaining the latter in its slideway.

Having thus fully described my invention, what I claim as new, and desire to secure by Letters Patent, is—

1. In apparatus for feeding glass, the combination of a molten-glass chamber having a mouth, a molten-glass receptacle having a retaining-wall for molten glass as high as the level of glass in said chamber and a bottom extending below the level of glass in said chamber and movable downwardly from said mouth, and severing means for the molten glass.

2. In apparatus for feeding glass, the combination of a molten-glass chamber having a mouth and a molten-glass receptacle having an inclined bottom movable downwardly from said mouth, the incline of said bottom changing during said downward movement, and severing means for the molten glass.

3. In apparatus for feeding glass, the combination of a molten-glass chamber having a mouth, a molten-glass receptacle having a bottom movable downwardly from said mouth, said receptacle having an open side at which said mouth is located, and means for severing the molten glass in said receptacle from the molten glass in said chamber.

4. In apparatus of the class described, the combination with a molten-glass chamber and a movable glass-receptacle, said chamber having a mouth and said receptacle having an open side adapted to register with said mouth and a retaining-wall for the molten glass as high as the molten glass in said chamber, of a knife at said mouth forming a gate for the molten glass in said chamber, and means for intermittently moving said receptacle and knife.

5. In apparatus for feeding glass, the combination of a molten-glass chamber having a mouth, a molten-glass receptacle at said mouth into which the molten glass from said chamber flows by gravity, said receptacle having a retaining-wall for the molten glass as high as the level of glass in said chamber, said receptacle being movable with relation to said chamber, and means acting between said receptacle and chamber for severing said molten glass.

6. In apparatus for feeding glass, the combination of a molten-glass chamber having a mouth, a molten-glass receptacle for receiving the flow of molten glass from said chamber, said chamber having walls as high as the level of molten glass in said chamber for limiting said flow and means for moving said receptacle with relation to said chamber.

7. In apparatus of the class described, the combination with a molten-glass chamber, a carrier, receptacles on said carrier, said carrier having openings at said receptacles adapted to respectively register with the mouth of said chamber the respective receptacles at said mouth having retaining-walls for the molten glass as high as the level of molten glass in said chamber, and a severing device at said mouth, the advancing walls of said openings each having a cutting edge at said severing device.

8. In apparatus of the class described, the combination with a molten-glass chamber and a movable glass-receptacle, of a carrier on which said receptacle is mounted, said carrier provided with a cutting edge for severing the molten glass in said receptacle from the molten glass in said chamber, said receptacle having an inlet for the molten glass from said chamber at one face thereof and a discharge-opening for the severed glass at another face thereof, substantially as described.

9. In apparatus of the class described, the combination with a molten-glass chamber and a movable glass-receptacle, of a carrier on which said receptacle is mounted, said carrier provided with a cutting edge for severing the molten glass in said receptacle from the molten glass in said chamber, said carrier acting as a gate for the mouth of said chamber and said receptacle having an inlet for the molten glass from said chamber at one face thereof and a discharge-opening for the severed glass at another face thereof, substantially as described.

10. In apparatus of the class described, the combination of a molten-glass chamber having a mouth, a carrier, receptacles mounted on said carrier, slots in said carrier at said receptacles, said carrier provided with cutting edges at said slots for severing the molten glass in the receptacle being charged from the molten glass in said chamber, and each of said receptacles having an inlet for the molten glass from said chamber at one face thereof and a discharge-opening for the severed glass at another face thereof, substantially as described.

11. In apparatus of the class described, the combination of a molten-glass chamber having a mouth, a revoluble carrier, said carrier having slots therein and webs between said slots, molten-glass receptacles mounted on said carrier at said slots, and means for imparting intermittent revoluble motion to said carrier for causing said respective receptacles and slots to register with said mouth, said carrier provided with cutting edges at said respective slots for severing the molten glass in the receptacle being charged from the molten glass in said chamber, and said webs respectively acting as gates for said mouth.

12. In apparatus for feeding glass, the combination of a molten-glass chamber having a mouth, a molten-glass receptacle, means for severing the molten glass in said receptacle into a blank, said receptacle having an inlet for the molten glass arranged to register with said mouth at one face thereof and a discharge-opening for the severed blank at another face thereof, and means for discharging the severed blank from said receptacle with a rolling motion.

13. In a device of the character described, the combination of a molten-glass chamber having a mouth, a glass-receptacle comprising walls, one of which walls has movement with relation to the other of said walls for imparting rolling movement to the glass blank in said receptacle.

14. In a device of the character described, the combination of a molten-glass chamber having a mouth, a glass-receptacle comprising walls, one of which has movement with relation to the other for imparting rolling movement to the glass blank in said receptacle, the other of said walls having a roughened surface for aiding said movement.

15. In an apparatus of the class described, the combination with a molten-glass chamber having a mouth, a severing device at said mouth, a glass-receptacle having walls, one of said walls having movement with relation to the other, and the other of said walls provided with grooves for imparting rolling movement to the glass blank in said receptacle.

16. In apparatus for feeding glass, the combination with a molten-glass chamber having a mouth, a molten-glass receptacle and a forming device, of means for severing the molten glass in said receptacle into a blank, said receptacle having an inlet for the molten glass arranged to register with said mouth at one face thereof and a discharge-opening for the severed blank at another face thereof, and a chute between said receptacle and forming device for imparting rolling motion to said blank by surface contact of said blank with said chute, substantially as described.

17. In apparatus of the class described, the combination of a molten-glass chamber having a mouth, a revoluble carrier, said carrier having slots therein and webs between said slots, molten-glass receptacles mounted on said carrier at said slots, means for imparting intermittent revoluble motion to said carrier for causing said respective receptacles and slots to register with said mouth, said carrier provided with cutting edges at said respective slots for severing the molten glass in said respective receptacles from the molten glass in said chamber, said webs respectively acting as gates for said mouth, and a chute at said carrier for receiving the severed glass from said respective receptacles.

18. In apparatus of the class described, the combination of a molten-glass chamber having a mouth, a revoluble carrier, said carrier having slots therein and webs between said slots, molten-glass receptacles mounted on said carrier at said slots, means for imparting intermittent revoluble motion to said carrier for causing said respective receptacles and slots to register with said mouth, said carrier provided with cutting edges at said respective slots for severing the molten glass in said respective receptacles from the molten glass in said chamber, said webs respectively acting as gates for said mouth, and a slanting chute adjacent said carrier for receiving the molten glass from said respective receptacles and imparting rolling motion thereto.

19. In apparatus of the class described, the combination of a molten-glass chamber having a mouth, a revoluble carrier, said carrier having slots therein and webs between said slots, molten-glass receptacles mounted on said carrier at said slots, means for imparting intermittent revoluble motion to said carrier for causing said respective receptacles and slots to register with said mouth, said carrier provided with cutting edges at said respective slots for severing the molten glass in said respective receptacles from the molten glass in said chamber, said webs respectively acting as gates for said mouth, a forming device, and a chute at said carrier between the charged receptacle and the forming device for receiving the severed molten glass from said receptacle, and constructed and arranged for imparting rolling motion to said severed blank between said mouth and forming device.

20. In a device of the character described, the combination of a molten-glass chamber having a mouth, an open-sided glass-receptacle, the open side of said receptacle registering with said mouth for receiving glass therethrough, means for severing said received molten glass, a wall with relation to which said receptacle has movement at said open side for permitting contact by said severed glass with said wall, and means for imparting said movement.

21. In apparatus for feeding glass, the combination of a molten-glass chamber having a mouth, a molten-glass receptacle at said mouth, and severing means for said molten glass, with means for adjusting said receptacle with relation to said mouth for adjusting the receiving capacity of said receptacle, and means for imparting movement to said receptacle with relation to said mouth.

22. In apparatus for feeding glass, the combination of a molten-glass chamber having a mouth, a movable molten-glass receptacle at said mouth, severing means for molten glass at said mouth, and means for adjusting said receptacle for varying its receiving capacity, the walls of said receptacle extending as high as the glass-level in said chamber for preventing overflow of molten glass at said receptacle.

23. In apparatus for feeding glass, the combination of a glass-receptacle, a carrier, said carrier having a slanting face along which said receptacle is adjustable and said receptacle having a sloping bottom merging into said slanting face, substantially as described.

24. In a machine of the character described, the combination with a molten-glass chamber having a mouth, an intermittently-rotating carrier having slots adapted to register with said mouth, receptacles on said carrier at said slots, severing means for molten glass at said mouth, and means for intermittently operating said severing means and carrier with relation to each other.

25. In a glass feeding and delivering machine, the combination with a chamber having a mouth extending below the glass-level in said chamber, a knife at said mouth for severing blanks of molten glass from the molten glass in said chamber and acting as a gate for the molten glass in said chamber, an intermittently-rotating carrier, receptacles thereon, said carrier having openings therein at said receptacles registering with said mouth at the positions of rest of said carrier, said carrier arranged up and down for having movement in front of said mouth, and means operating said severing means and carrier intermittently.

26. In a glass feeding and delivering machine, the combination with a molten-glass chamber, a housing in front of the same and having a mouth extending below the level of glass in said chamber, a knife having sliding connection with said housing and acting as a gate for the molten glass in said chamber, an intermittently-rotating carrier having substantially horizontal rotary axis, receptacles for molten glass on said carrier arranged to be brought intermittently to positions of rest in front of said mouth for receiving the molten glass from said chamber, and means for intermittently rotating said carrier for discharging the severed glass from said respective receptacles.

27. In a glass feeding and delivering machine, the combination with a molten-glass chamber, a housing in front of the same and having a mouth extending below the level of glass in said chamber, a knife having sliding connection with said housing and acting as a gate for the molten glass in said chamber, an intermittently-rotating carrier having substantially horizontal rotary axis, receptacles for molten glass on said carrier arranged to be intermittently brought to positions of rest in front of said mouth for receiving the molten glass from said chamber, and means for intermittently rotating said carrier for discharging severed glass from said respective receptacles, said housing having a facing forming a side for said discharging-receptacle.

28. In a glass feeding and delivering machine, the combination with a molten-glass chamber, a housing in front of the same and having a mouth extending below the level of glass in said chamber, a knife having sliding connection with said housing and acting as a gate for the molten glass in said chamber, an intermittently-rotating carrier having substantially horizontal rotary axis, receptacles for molten glass on said carrier arranged to be intermittently brought to positions of rest in front of said mouth for being charged with the molten glass from said chamber, and means for intermittently rotating said carrier for discharging severed glass from said charged receptacle, said housing having a ribbed facing forming a wall for said charged receptacle with relation to which the receptacle on said carrier has movement for imparting rolling motion to said charged glass.

29. In a glass feeding and delivering machine, the combination of a molten-glass chamber, a housing having a mouth, a knife having reciprocation in said housing and forming a gate for said mouth, a knife-bar for the latter, a slide on said housing, receding wipers and contacts therefor between said knife-bar and slide, and means for reciprocating said slide.

30. In a glass feeding and delivering machine, the combination of a molten-glass chamber, a housing having a mouth, a knife having reciprocation in said housing and forming a gate for said mouth, a knife-bar for the latter, a slide on said housing, receding wipers and contacts therefor between said knife-bar and slide, means for reciprocating said slide, a rotary carrier, receptacles thereon adapted to intermittently register with said mouth for receiving the molten glass from said mouth, said carrier having connection with said slide for intermittently and successively operating said knife and carrier.

31. The method or process of preparing molten glass for forming mechanism which consists in discharging the molten glass from a molten-glass chamber into a receptacle in which the molten glass is permitted to attain a level substantially coincident with the level of the molten glass in said chamber, severing said discharged molten glass, and then ejecting said severed glass from said receptacle.

32. The method or process of preparing molten glass for forming mechanism which consists in discharging the molten glass from a molten-glass chamber into a receptacle in which the molten glass is permitted to attain a level substantially coincident with the level of the molten glass in said chamber, severing the molten glass in said receptacle from the molten glass in said chamber, and discharging said molten glass from said receptacle with a rolling motion.

33. The method or process of preparing molten glass for shaping mechanism which consists in discharging the molten glass from a molten-glass chamber into a receptacle and ejecting said discharged glass with a rolling motion while passing to said shaping mechanism.

34. The method or process of preparing molten glass for shaping mechanism which consists in discharging the molten glass from a molten-glass chamber and severing such discharged glass in the form of a blank and subjecting such blank to rolling motion by surface contact in its passage to the shaping mechanism.

35. The method or process of preparing molten glass for shaping mechanism which consists in discharging the molten glass from a molten-glass chamber into a receptacle, severing said discharged glass in the form of a blank, and rolling said blank by the movement of said receptacle preparatory to its discharge therefrom into the shaping mechanism.

36. In a glass feeding and delivering machine, the combination of a molten-glass chamber having a mouth, a receptacle into which molten glass is adapted to discharge, means for severing the discharged molten glass into a blank, said receptacle having a slanting bottom and means for shifting said receptacle to change said slant of said bottom for discharging said blank.

In testimony whereof I have subscribed my name hereto in the presence of two subscribing witnesses.

JOHN SCHIES.

Witnesses:
G. F. McDONNELL,
MARY A. SCHIES.